US011994145B2

(12) United States Patent
Ottersten

(10) Patent No.: US 11,994,145 B2
(45) Date of Patent: May 28, 2024

(54) FAN FOR AIR HANDLING UNIT (AHU) ASSEMBLED FROM SEVERAL PARTS WITH RADIAL AND AXIAL RETAINERS

(71) Applicant: SWEGON OPERATIONS AB, Kvänum (SE)

(72) Inventor: Martin Ottersten, Källby (SE)

(73) Assignee: SWEGON OPERATIONS AB, Kvänum (SE)

( * ) Notice: Subject to any disclaimer, the term of this patent is extended or adjusted under 35 U.S.C. 154(b) by 0 days.

(21) Appl. No.: 17/636,795

(22) PCT Filed: Aug. 20, 2020

(86) PCT No.: PCT/SE2020/050802
§ 371 (c)(1),
(2) Date: Feb. 18, 2022

(87) PCT Pub. No.: WO2021/034260
PCT Pub. Date: Feb. 25, 2021

(65) Prior Publication Data
US 2022/0290685 A1    Sep. 15, 2022

(30) Foreign Application Priority Data

Aug. 20, 2019   (SE) .................................. 1950948-8

(51) Int. Cl.
*F04D 29/28*    (2006.01)
*F04D 25/08*    (2006.01)
(Continued)

(52) U.S. Cl.
CPC .......... *F04D 29/282* (2013.01); *F04D 25/08* (2013.01); *F04D 29/2222* (2013.01);
(Continued)

(58) Field of Classification Search
CPC .......... F04D 29/2222; F24F 1/0022; F05D 2230/51; F05D 2260/36
See application file for complete search history.

(56) References Cited

U.S. PATENT DOCUMENTS 3,225,422 A * 12/1965 Sebok .................. B21D 53/267
29/889.4
4,120,084 A * 10/1978 Wallman ................ B21D 39/03
403/360
(Continued)

FOREIGN PATENT DOCUMENTS

CN    109899319 A    6/2019
EP    1184574 A2    3/2002
(Continued)

OTHER PUBLICATIONS

WO-2019107269-A1, Kojima et al. (Jun. 6, 2019) English Translation (Year: 2023).*
(Continued)

*Primary Examiner* — David E Sosnowski
*Assistant Examiner* — Aye S Htay
(74) *Attorney, Agent, or Firm* — NIXON & VANDERHYE

(57) ABSTRACT

Disclosed is an Air Handling Unit, AHU, including a fan inducing a flow in an air ventilation ducting system. The fan includes a front disc, a back plate and fan blades manufactured as separate units. The fan provides a radial or mixed flow. The fan blades have an upper edge including upper attachment protrusions attached to the front disc and a lower edge including lower attachment protrusions attached to the back plate. The fan blade includes at least two upper and lower attachment protrusions protruding through the front disc and back plate indentations, respectively, forming axial retainers. An axial locker on the protruding portion provides a retaining axial force between the front disc and the back
(Continued)

plate. The fan further includes another other upper and lower attachment protrusion cooperating with front disc and back plate indentations, respectively, forming radial retainers preventing the blades from dislocating in the radial direction.

20 Claims, 8 Drawing Sheets

(51) Int. Cl.
    *F04D 29/22*      (2006.01)
    *F04D 29/30*      (2006.01)

(52) U.S. Cl.
    CPC ........ *F04D 29/30* (2013.01); *F05D 2230/232* (2013.01); *F05D 2230/51* (2013.01); *F05D 2260/36* (2013.01); *F05D 2300/43* (2013.01)

(56) References Cited

U.S. PATENT DOCUMENTS

| | | | | |
|---|---|---|---|---|
| 5,328,332 | A * | 7/1994 | Chiang | F04D 29/281 |
| | | | | 416/195 |
| 6,386,831 | B1 * | 5/2002 | Stahl | F04D 29/281 |
| | | | | 416/186 A |
| 6,592,329 | B1 * | 7/2003 | Hirose | F04D 17/16 |
| | | | | 416/203 |
| 2012/0048953 | A1 * | 3/2012 | Wang | G01M 9/04 |
| | | | | 236/51 |
| 2015/0204344 | A1 | 7/2015 | Shen et al. | |
| 2015/0308451 | A1 * | 10/2015 | Baer | F04D 29/281 |
| | | | | 416/232 |
| 2015/0322960 | A1 * | 11/2015 | Giovannetti | F04D 17/10 |
| | | | | 29/889.22 |
| 2016/0341210 | A1 * | 11/2016 | Ishikawa | F04D 29/08 |

FOREIGN PATENT DOCUMENTS

| | | |
|---|---|---|
| EP | 2 940 313 | 11/2015 |
| EP | 3399195 A1 | 11/2018 |
| GB | 2 242 515 | 10/1991 |
| JP | 2010-059876 | 3/2010 |
| JP | 2018-204560 | 12/2018 |
| JP | 2018204560 A * | 12/2018 |
| WO | 2019/107269 | 6/2019 |
| WO | WO-2019107269 A1 * | 6/2019 ............. F04D 29/28 |

OTHER PUBLICATIONS

JP-2018204560-A (Dec. 2018; Furuta et al.) English Translation (Year: 2023).*
International Search Report for PCT/SE2020/050802 dated Sep. 23, 2020, 5 pages.
Written Opinion of the ISA for PCT/SE2020/050802 dated Sep. 23, 2020, 8 pages.
Office Action issued in European Patent Application No. 20854152.4, dated Aug. 21, 2023.

* cited by examiner

FAN FOR AIR HANDLING UNIT (AHU) ASSEMBLED FROM SEVERAL PARTS WITH RADIAL AND AXIAL RETAINERS

CROSS-REFERENCE TO RELATED APPLICATIONS

This application is the U.S. national phase of International Application No. PCT/SE2020/050802 filed Aug. 20, 2020 which designated the U.S. and claims priority to Swedish Patent Application No. 1950948-8 filed Aug. 20, 2019, the entire contents of each of which are hereby incorporated by reference.

BACKGROUND OF THE INVENTION

Field of the Invention

The present invention relates to an Air Handling Unit (AHU) comprising a fan and a fan for an AHU. The fan is of the radial flow type.

Description of the Related Art

Heating and Ventilating Air Conditioning (HVAC) systems are generally installed in buildings today when a new building is constructed or an old building is renovated. A HVAC system generally includes an Air handling Unit (AHU) for intake and discharge of air to and from the building. An AHU is often provided with a heat exchanger arrangement such that the discarded air is heat exchanged with the intake air. In recent years, there has been an increased focus on lowering the energy consumption for HVAC systems and demand controlled ventilation (DCV) systems are frequently installed in new and renovated buildings in order to reduce the energy consumption. DCV systems generally include a multitude of sensors in order to provide relevant information for deciding a ventilation demand. Such sensors may for example detect occupancy in a room, air quality, temperature, predicted usage of a room and weather forecasts. The information from the sensors are used as input data in a control unit which uses the collected data, possibly together with user input data such as desired temperature, in order to control the HVAC system. Depending on the size of the building and the required ventilation and temperature adjustments needed, the flow of air in the HVAC system may vary considerably depending on the demand. It is therefore desired to make the AHU work efficiently to provide fresh air in the HVAC system over a wider range of desired air flow for a DCV system than when there is constant flow or a flow set to be at different predefined levels, e g "low", "medium" and "high".

SUMMARY OF THE INVENTION

The object of the present invention is to provide an improved Air Handling Unit (AHU) for a Heating and Ventilating Air Conditioning (HVAC) system. In particular, the invention is directed to provide an improved fan to be used in the AHU. AHUs used in HVAC systems for offices and other larger premises generally comprise a fan in order to create a flow. In case the fan is located in the fresh air intake for providing supply air to the building it will provide a supply air flow and build up an overpressure in the supply air ventilation ducts. The fan or fans comprised in the AHU are generally of the radial flow type due to a desire to provide for a desired flow rate while avoiding the overall size of the fan and AHU to be too large. The present invention also relates to a fan for an Air Handling Unit (AHU).

A fan wheel could be manufactured as a single unit including a back plate, front disc and fan blades. However, the fan wheel according to the invention is manufactured such that the back plate, front disc and fan blades are manufactured as separate units which are assembled to a fan wheel afterwards. If such a method is used for producing the fan wheel, the design of the different parts may more easily and with less cost be altered than if a complete wheel is moulded as a single unit. In addition, certain shapes may be hard to be able to produce if the wheel is moulded as a single unit.

The present invention is thus directed to An Air Handling Unit (AHU) intended to be used in a Heating and Ventilating Air Conditioning (HVAC) system. The AHU is provided with an extract air channel and/or a supply air channel. An extract air channel comprises at least one extract air inlet for guiding extract air from a building to the outside through at least one extract air outlet and a supply air channel comprises at least one supply air inlet for guiding supply air from the outdoor into a building through at least one supply air outlet adapted to be connected to an air ventilation ducting system. In general, when the AHU includes a supply air channel and an extract air channel, the AHU is further arranged such that the extract air channel and the supply air channel are in a heat exchanging relation with each other via a heat exchanger. This arrangement is in particular useful at occasions when there is a rather large qdifference in outdoor and indoor temperature, e.g. at wintertime having an outdoor temperature below zero and a desired indoor temperature of around 20 degrees Celsius. However, the AHU may also be designed to only comprise either an extract air channel or a supply air channel and is in this case referred to as single direction (SD) AHU. In these cases, there may be some kind of treatment arrangement as well, e.g. for cooling, heating, cleaning or humidifying the air passing through the AHU. In case there are separate AHU for the supply air and extract air these AHUs may be thermally connected by a heat pump arrangement. The AHU further comprises at least one fan in order to induce a flow in the air ventilation ducting system when connected and in a working mode. In general, when the AHU includes a supply air channel and an extract air channel, there is a fan provided in both the supply air channel and the extract air channel. The fan used in the AHU is a radial fan, also commonly referred to as centrifugal fan, or a mixed flow fan having a flow from the fan in a combined radial and axial direction. The fan comprises a front disc (also called shroud), a back plate and a plurality of fan blades located between the front disc and the back plate. The front disc, back plate and fan blades are manufactured as separate units and assembled to a fan. In general, the separate units are made by moulding a polymer, possibly provided with additives and reinforcing components, in a mould. However, other material and manufacturing methods are of course also possible. The front disc is provided with a hole where through air enters. The fan blades are arranged to provide a radial flow or mixed flow from the fan and the fan blades are arranged to have its leading edge closer to the centre axis of the fan than its trailing edge such that the leading edge will meet the flow of air entering through the hole in the front disc. The trailing edge is arranged further away from the centre axis of the fan, normally in the vicinity of the periphery of the fan, where the air leaves the fan. The fan blades have an upper edge in contact with and facing towards the front disc and a lower edge in contact with and facing towards the back plate. The fan blades have also a blade body with a first side and a second side. In many cases these blades are aerodynamically designed and being shaped as aerofoils in order to adapt its high pressure side respectively low pressure side to the flow of air along the blades through the fan.

The fan blades are designed to comprise a multitude of upper attachment protrusions protruding from the upper edge which are designed to fit into corresponding front disc indentations in the front disc. The fan blades further comprise a multitude of lower attachment protrusions protruding from the lower edge designed to fit into corresponding back plate indentations in the back plate, The arrangement of indentations and protrusions will be referred to as retainers and serve the purpose of forming retaining elements in order to keep the fan wheel together when the fan wheel is assembled by attaching the blades to the back plate and front disc.

In order to provide an assembled fan wheel with high strength and to reduce stresses in the components, in particular when the fan wheel is subjected to forces from high rotational speeds, the indentations and protrusions forming a retainer are designed so as to provide retaining forces working mainly in different directions for maintaining the assembled fan wheel in its intended shape.

Some of the indentations and their corresponding protrusions are designed to mainly function as retainers in the axial direction, i.e. to retain the back plate and front disc at a constant distance from each other in the axial direction. An upper protrusion and corresponding indentation in the front disc cooperating so as to function as a retainer in the axial direction will be referred to as a front disc axial retainer and a lower protrusion and corresponding indentation in the back plate cooperating so as to function as a retainer in the axial direction will be referred to as a back plate axial retainer.

Other protrusions and their corresponding indentations are designed to mainly function as retainers counteracting forces working in a plane perpendicular to the axial direction, most importantly in the radial direction, i.e. to retain the blades at the same distance and position relative the centre axis of the fan wheel. An upper protrusion and corresponding indentation in the front disc cooperating so as to function as a retainer in the radial direction will be referred to as a front disc radial retainer and a lower protrusion and corresponding indentation in the back plate cooperating so as to function as a retainer in the radial direction will be referred to as a back plate radial retainer.

In order to provide for a desired distribution of forces, at least one fan blade in the assembled fan wheel is attached by at least two front plate axial retainers, each one comprising an upper attachment protrusion protruding from the upper edge of the fan blade and adapted to fit into a corresponding front disc indentation which is designed as through holes in the front disc. The front plate axial retainer will be provided with an axial locker on the distal end of the protrusion when the fan wheel is assembled so as to prevent the front plate and the blade to move relative each other in the axial direction. Such an arrangement could for example be achieved by having a circular shaped upper protrusion and letting the upper protrusion protrude through the front disc indentation and attaching a locker ring on the distal end of the upper protrusion. The locker ring will thus be clamped onto the distal end and kept in place by friction forces between the locker ring and the upper protrusion. The locker ring may be made of metal, e.g. stainless steel. The annular surface of the locker ring will abut against the surface of the disc plate surrounding the indentation. Likewise, there are at least two back plate axial retainers, each one comprising a lower attachment protrusion protruding from the lower edge of the fan blade designed to fit into a corresponding back plate indentation which is designed as a through hole in the disc plate. The locking arrangement for the back plate axial retainer may be designed as described for the front disc axial retainer. Hence, the front disc and back plate axial retainers will provide for a retaining force if there is a force striving to separate the front disc and back plate in the axial direction.

Above it has been disclosed that a locker ring may be used for the axial retainer as an axial locker. However, other features may be used to provide an axial locker and it may be possible to either weld a locking plate or locking pin to the protrusion or working the distal end of the protrusion protruding through the indentation such that its distal end is deformed to provide a distal end portion having a cross sectional area being larger than the area of the indentation in a similar way as the head of a screw or nail are enlarged to prevent the screw or nail to pass through a hole.

The retainers may for example be designed such that the axial retainers are provided with a locking arrangement restraining axial movement by locking the protrusion axially relative the indentation while the radial retainers have no locking feature for axial movement.

The protrusion forming part of an axial retainer has been exemplified as having a circular cross-sectional geometry but its cross section could have any desired shape, e.g. rectangular, octagonal or oval.

The at least one fan blade is further provided with at least one front disc radial retainer comprising an upper attachment protrusion protruding from the upper edge of the fan blade and adapted to fit into a corresponding front disc indentation. In this case, the indentation is not necessarily a through hole in the front disc but may also be a recess or groove having a bottom, i.e. the indentation formed in the front disc is not extending through the front disc. The front disc radial retainer will thus function to mainly counteract radial forces, in particular centrifugal forces at high rpm, so as to prevent the blade to move relative the front disc in directions along the surface of the front disc, essentially perpendicular to the axial direction of the fan. Likewise, there is at least one back plate radial retainer comprising a lower attachment protrusion protruding from the lower edge of the fan blade and adapted to fit into a corresponding back plate indentation which may be designed in the same way as disclosed concerning the front disc radial retainer.

The axial retainers could be designed such that the through going indentations forming part of the axial retainers are designed to have an area which is larger than the cross sectional area of the portion of the protrusion located in the indentation such that there is gap between the inner circumference of the indentation and the protrusion. The axial retainers could be designed such that the gap is designed to be present all around the inner circumference of the indentation or having a gap stretching along one or several portions of the inner circumference of the indentation while the other portions of the inner circumference of the indentation is in contact with the protrusion. The axial retainer having alternating portion(s) with gaps and portion(s) where the inner circumference of the indentation is in contact with the protrusion is preferably designed such that there is a gap present in those portions which should be the subject of strong radial forces from the attachment protrusion when the fan wheel is rotating if the attachment protrusion should be in contact with the inner circumference of the indentation. Hence, a gap in the axial retainer is desired at portions where radial forces should arise when the fan wheel is rotating so as to avoid or reduce forces from the axial retainer acting in the radial direction on the inner circumference of the indentation. The other portions, which are subjected to no or low radial forces from the attachment protrusion when the fan is rotating, may be in contact with or very close to the inner circumference of the indentation.

The radial retainer may be designed to form a close fit between the indentation and the protrusion, either along the complete indentation or having a close fit between the indentation and the protrusion at locations where there will be strong forces acting when the fan wheel is rotating. In case the radial retainer is intended to have a close fit with between the protrusion and the indentation all along the inner circumference of the front disc indentation and/or back plate indentation forming part of the radial retainer, the shape and size of the cross sectional area of the portion of an upper attachment protrusion and/or a lower attachment protrusion located in the corresponding front disc indentations and/or back plate indentation is designed to follow the contour of the corresponding indentation all the way.

However, the radial retainer could also be designed such that a portion or some portions of the inner circumference of a front disc indentation and/or back plate indentation could be designed to cooperate with a corresponding upper attachment protrusion and/or lower attachment protrusion to be in contact with each other while there is a gap along another portion or portions. In this case, an upper attachment protrusion and/or a lower attachment protrusion is designed to cooperate with a corresponding front disc indentation and/or back plate indentation are designed such that the portion of the corresponding attachment protrusion located in the indentation makes contact with the inner circumference of the corresponding front disc indentations and/or back plate indentation along a portion or portions of the inner circumference. These portions are preferably selected such that the portions will be subjected to strong forces from the rotational movement of the fan in a direction perpendicular to the axial direction, e.g. in the radial direction, by a protrusion in contact with said portion of the inner circumference. Along another portion, or portions, of the inner circumference of the indentation, which should have been subjected to no or weak forces from the rotational movement of the fan in a direction perpendicular to the axial direction, e.g. in the radial direction, by a protrusion in contact with the inner circumference of the indentation at these portions, there may be a gap between the inner circumference of the indentation and the protrusion. Hence, the gap is actually not essential for the force distribution in the radial retainers but it may be an advantage for tolerances in the production of the individual components and thus facilitate assembling of the fan wheel from separate parts making it easier to fit in the fan blades onto the front disc and back plate.

A front disc indentations or back plate indentation forming part of a radial retainer could be designed to be a recess or groove having a bottom, i.e. a non through hole. There may be advantages in not using through holes for the radial retainers as this may improve the strength of the front disc and/or the back plate. On the other hand, through holes could help in release stress induced in the plate while rotating and there may thus be advantages in using through holes and recesses or grooves depending on the forces to which the fan is subjected to and the material used for the fan.

There could be several radial retainers positioned at different positions along the length of the upper respectively lower edge of a fan blade. In addition, or as an alternative, there may be one or several retainers extending along the upper respectively lower edge of a fan blade. For example, the indentation, which may be a through hole or a groove or recess only partly extending into the back plate or front disc, could have an elongated shape as an oval or rectangular shape adapted to fit a corresponding shape of the indentation. If an elongated indentation and corresponding protrusion is used as a radial retainer, it may be possible to distribute the radial forces along the length of the retainer. Alternatively, there may be other shapes of the radial retainers, e.g. L-shaped or star shaped indentations having corresponding shapes of the protrusion intended to fit into the indentations or having a multitude of circular or elongated protrusions designed to fit into the same indentation at strategic locations for providing a desired retaining force in the radial direction. There may also be a multitude of differently shaped indentations and corresponding protrusions working together so as to provide radial retaining forces distributed along the length of the radial retainers. Hence, there is a multitude of different ways in achieving a retaining force in the radial direction by locating a radial retainer or retainers along the length of the upper respectively lower side of the blade where it is attached to the front disc respectively the back plate. There could be at least two upper attachment protrusions provided on the upper edge of the blade forming part of two front disc radial retainers whereby said at least two protrusions being spaced apart from each other along the longitudinal extension of the upper edge. Alternatively, or in addition to the front disc radial retainer, there could be at least two lower attachment protrusions provided on the lower edge of the blade forming part of two back plate radial retainers whereby said at least two protrusions being spaced apart from each other along the longitudinal extension of the lower edge.

It is further possible that there is provided at least one upper attachment protrusion provided on the upper edge of the blade forming part of a front disc radial retainer and the upper attachment protrusion being elongated and having a length being at least three times longer than its width. Hence, such an arrangement may aid in distributing the radial forces along the length of the radial retainer and may be used to distribute the radial forces along the length of the upper edge of the blade. Likewise, there may be provided a lower attachment protrusion provided on the lower edge of the blade forming part of a back plate radial retainer and the lower attachment protrusion being elongated and having a length being at least three times longer than its width. There may of course be other shapes of a single protrusion extending along the longitudinal direction of the upper or lower side of the blade and there may of course be a multitude of protrusions being elongated, circular or of any desired shape. In case there are several elongated protrusions, they may be designed to have their longitudinal extension in different directions relative the radial direction. A single elongated indentation could also be designed to have its longitudinal extension in different directions relative the radial direction by being bent or curved, e.g. shaped as an L, X, V or C.

The fan is preferably designed such that there is distinct difference between how much of the forces in the different directions that is distributed between the axial retainers and the radial retainers. Ideally, the forces are distributed such that the axial retainers are only counteracting forces in the axial direction and the radial retainers are counteracting forces in a direction perpendicular to the axial direction. To use different retainers working in different directions will aid in reduce bending forces in the fan wheel. In general the fan wheel may endure rather high forces if the retainers are designed to provide retaining forces only mainly in either the axial direction or directions perpendicular to the axial direction. The retainers have been divided into two groups whereof the axial retainers will essentially work only in the axial direction and radial retainers will essentially work only in a plane perpendicular to the axial direction. The radial retainers will mainly act in the radial direction due to the rotation of the fan wheel but there will also be forces working in the angular direction, e.g. due to the forces from the air streaming through the fan and induced by the rotational motion of the fan wheel. However, the main component of the forces (in the plane perpendicular to the axial direction) which a blade is subjected to during high rotational speeds will be in the radial direction. For this reason the retainers working to counteract the forces in the plane perpendicular to the axial direction have been referred to as radial retainers even though they are designed to counteract all forces in the plane. Hence, the fan wheel should be designed such that the counterforce or retaining force from the radial retainers, designed to provide a retaining force mainly in the plane perpendicular to the axial direction, is at least 2 times stronger, preferably 5 times stronger and most preferably 10 times stronger in the plane perpendicular to the axial direction than for the counterforce working in the axial direction. The axial retainers shall be designed such that the counterforce from the axial retainers counteracting a force striving to separate the front disc and back plate in the axial direction is at least 2 times stronger, more preferably 5 times stronger and more preferably 10 times stronger than the counterforce in the plane perpendicular to the axial direction. The forces shall be measured when the fan wheel is operating within its normal operating modes as intended, e.g. rotating according to control signals from an Electronic Control Unit (ECU) in an AHU.

The fans in the AHU are thus generally designed as described above and serve its purpose for a rather wide variety of working conditions. However, along with an increased desire for controlling the AHU to function over a wider range of flow and thus larger range of revolutions per minute (rpm) and air volume flows. In addition, there is a desire to keep the size of an AHU small and there may thus be a desire to allow a fan wheel to rotate with higher rpm in order to provide a relatively large flow with a relatively small fan wheel size. In order to allow the fan wheel to rotate with a desired high rpm there is a need to design and assemble a fan wheel which may withstand the high forces acting on the fan wheel. The AHU is conventionally connected to an Electronic Control Unit, (ECU) for control of the speed of the fan. The speed of the fan will vary in dependence of one or several conditions sensed by at least one sensor in order to provide a manually or automatically set desired condition. The sensors may for example be temperature sensors, occupancy sensors, indoor air quality sensors such as carbon dioxide sensors, outdoor temperature sensors and humidity sensors. Manually set conditions may be a desired temperature or increased ventilation due to increased number of occupants in the room. In recent years there has been an increased desire for demand controlled ventilation (DCV) aiming at controlling the fan at a wide operating range from providing air flow close to zero up to maximum flow depending on the demand. The demand for fan wheels having a higher strength has thus increased with a desire to be able to provide a higher flow and thus a higher rpm. Hence, the fan described above is designed to provide sufficient strength by having a combination of axial and radial retainers to be used in an AHU controlled by an ECU programmed to allow the trailing edge of a fan blade to have speeds of at least 30 m/s up to 60 m/s, i.e. the tangential speed of the trailing edge. This speed is often referred to as tip velocity.

BRIEF DESCRIPTION OF THE DRAWINGS

The present invention will now be described more in detail with reference to the appended drawings, where.

DESCRIPTION OF THE PREFERRED EMBODIMENTS

Figure 1:
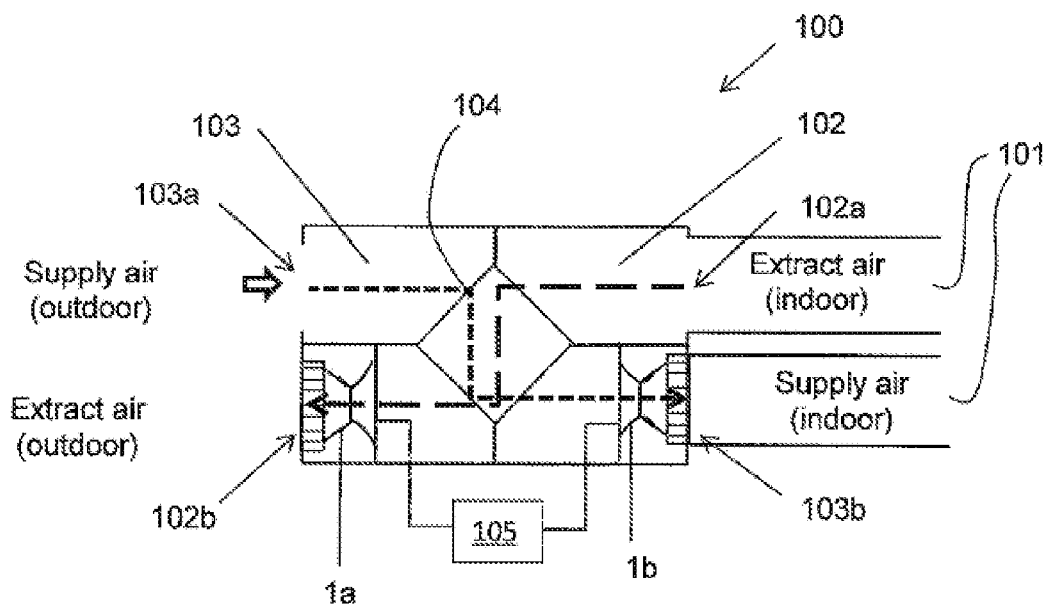
FIGS. 1a-1c disclose different Air Handling Units
FIGS. 2a-2d disclose a radial fan comprising blades, a back plate and a front disc
FIGS. 3a-3c disclose a fan blade
FIG. 4 discloses a front disc
FIG. 5 discloses a back plate
FIG. 6 discloses an assembled fan having radial and axial front disc retainers
FIG. 7 discloses an assembled fan having radial and axial back plate retainers
FIG. 8 discloses a portion of the front disc with detailed view of an axial retainer
FIG. 9 discloses a cross sectional view of a fan blade mounted in a fan
FIG. 10 discloses the main direction of forces from different retainers
Figure 1:
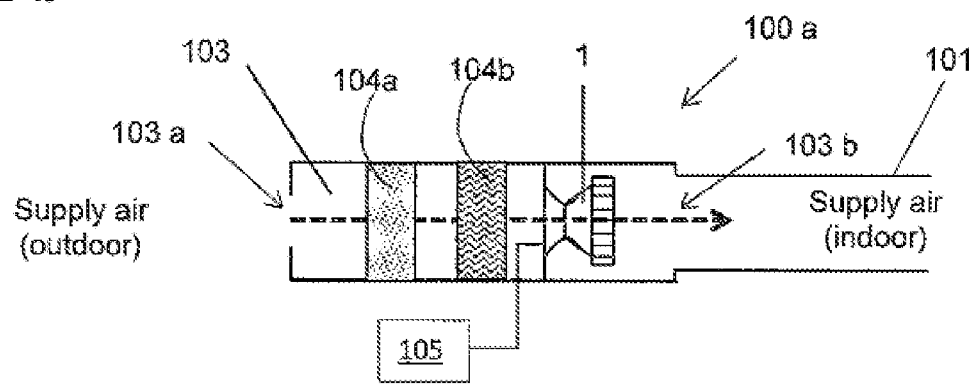
Figure 1:
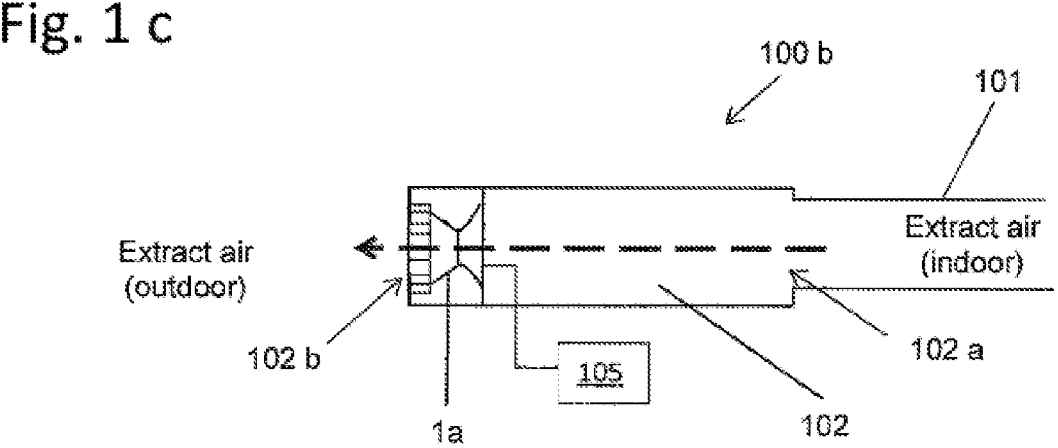

In FIG. 1 different embodiments of an Air Handling Unit (AHU) 100 suitable for the present invention are disclosed. In FIG. 1a there is disclosed an AHU 100 connected to an air ventilation ducting system 101 comprising an extract air channel 102 and a supply air channel 103. The extract air channel 102 comprises an extract air inlet 102a connected to the air ventilation ducting system 101 for exhausting air from a building via an extract air outlet 102b for discarding extract air to the environment. The supply air channel 103 comprises supply air inlet 103a for inlet of fresh air from the environment and a supply air outlet 103b for guiding fresh air to the air ventilation ducting system to be distributed via the air ducting system 101 to a building. The extract air channel 102 and the supply air channel 103 are in a heat exchanging relation via a heat exchanger 104 in order to exchange heat between the extract air and the supply air. The extract air channel 102 is provided with an extract air fan 1a in order to induce a flow of extract air from a building via the air ventilation ducting system 101 and the supply air channel 103 is provided with a supply air fan 1b for inducing a flow of fresh air in the supply air channel 103 in order to distribute supply air to the building via the air ventilation ducting system. The AHU 100 is also connected to an Electronic Control Unit (ECU) 105 for control of the fans 1a, 1b.

The design of the AHU 100 in FIG. 1a is only schematically disclosing how an AHU comprising a pair of fans 1a, 1b according to the invention may be designed. The AHU 100 may include further devices such as dampers for controlling the flow, additional air treatment units, e.g. humidifiers, filters or additional heat regulating devices such as a heat pump or electrical heaters, as well as sensors for sensing relevant parameters concerning air quality and temperature of the air.

In FIG. 1b there is disclosed another example of an AHU 100a suitable for the present invention which is of the single direction (SD) kind. An AHU of the SD kind only provides flow of air in one direction and this AHU 100 comprises a supply air channel 103 but no extract air channel. The AHU 100a is designed to only provide a flow of fresh air entering through a supply air inlet 103a to the AHU 100a and to be further guided via a supply air outlet 103b to an air ventilating ducting system 101 in order to distribute fresh air to a building. The AHU is further provided with a fan 1 in order to induce a flow of fresh air in the air ventilating ducting system. The AHU 100a is also provided with filter 104a in order to clean the supply air and a temperature conditioning unit 104b in order to adjust the temperature of the supply air stream.

In FIG. 1c there is disclosed still another example of an AHU 100a suitable for the present invention. This AHU 100b is only of the SD kind which comprises an extract air channel 102 but no supply air channel. The AHU 100b is thus designed to only provide a flow of extract air from a building. The extract air is guided from the air ventilating ducting system 101 to the AHU 100b via an extract air inlet 102a guided through the AHU 100 to a supply air outlet 102b to the environment. The AHU 100b is further provided with a fan 1 in order to induce a flow of extract air in the air ventilating ducting system 101. The AHU 100 in FIG. 1c does not include any air treatment units but could of course be provided with additional devices, e.g. some kind of heat recovery arrangement in order to regain heat from the air exhausted. For example, in case there is a single direction (SD) AHU present in a building for guiding extract air out of a building to the environment, as disclosed in FIG. 1c, there is also often present a supply air single direction AHU as disclosed in FIG. 1b. Hence, the AHU 100a in FIG. 1b and the AHU 100b in FIG. 1c may both comprise heat pumps connected between them such that heat is transferred between the supply air stream of the AHU 100a in FIG. 1b and the extract air stream of the AHU 100b in FIG. 1c.

Hence, the above figures only serve as a few examples from a multitude of different kinds of AHUs which may suitably be used for a fan 1, 1a, 1b as will be described below.

Figure 7:
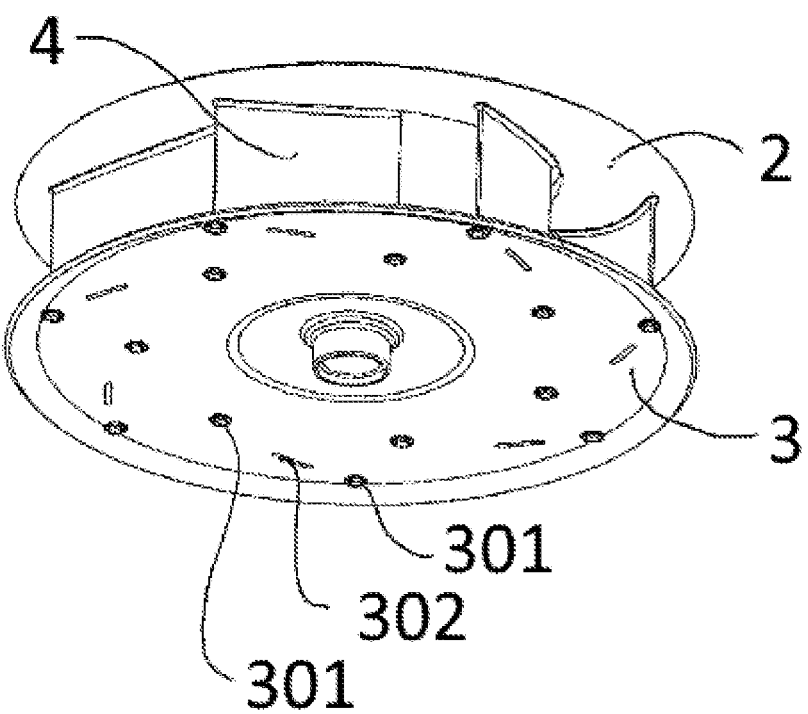

In FIG. 2 there is disclosed a fan 1 for radial flow. In FIG. 2a there is disclosed an isometric view of the fan 1 comprising a front disc 2, a back plate 3 and a multitude of fan blades 4 interposed between the front disc 2 and the back plate 3. In this case the front disc 2, back plate 3 and the fan blades 4 are produced as separate units which are assembled together by attaching the fan blades 4 to the front disc 2 and back plate 3 by any suitable means, e.g. by welding or by through going pins. However, the fan could also be moulded as a single piece. In the centre of the front disc 2 an opening or hole 21 through which air may enter into the fan is provided. The fan 1 is further provided with axial retainers 201 and radial retainers 202 for attaching the fan blade 4 to the front disc 2. An axial retainer is designed to mainly provide a retaining force along the axial direction, i.e. in the direction parallel to an axis around which the fan wheel is intended to rotate. A radial retainer is designed to mainly provide a retaining force in a direction perpendicular to the axial direction and in particular in the radial direction from the axis around which the fan wheel rotates. There are also retainers for attaching the fan blade 4 to the back plate 3 (not shown, see FIG. 7).

Figure 2A:
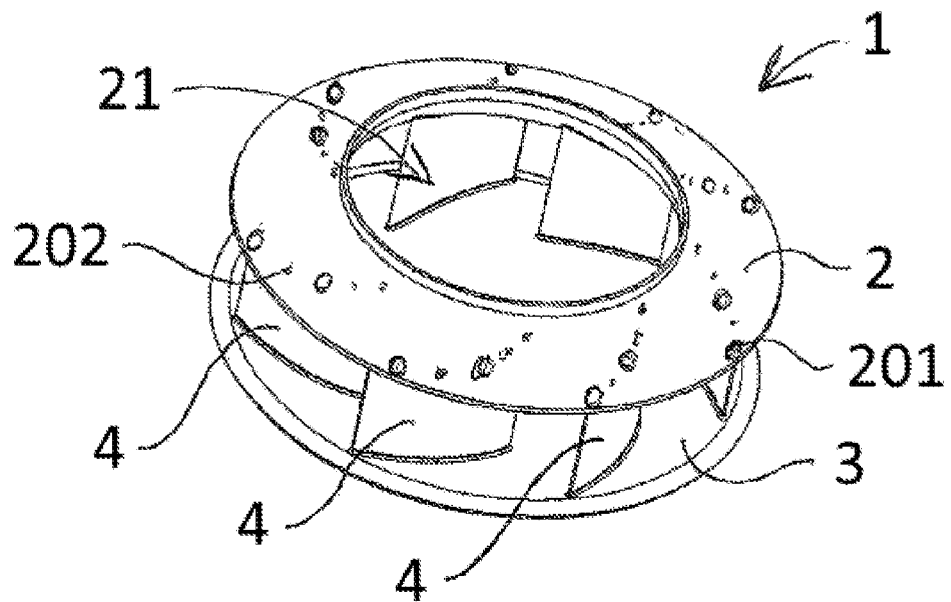
Figure 2B:
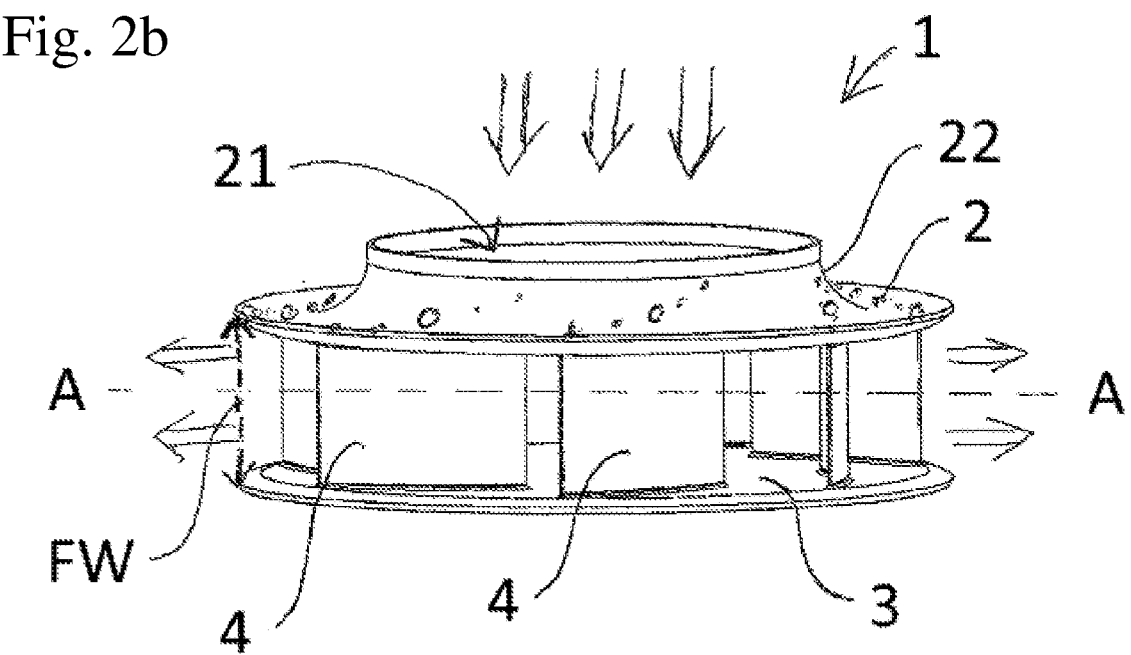

The flow of air through the fan 1 is disclosed in FIG. 2b which is a side view of the fan 1. FIG. 2b discloses how an axial flow of air is formed when air is sucked in through the central hole 21 in the front disc 2 when the fan is operating. The suction force is created by the fan blades 4 designed to provide a radial flow from the rotating fan 1. The blades 4 of the fan 1 is thus designed to produce a radial flow of air and together with the back plate 3 and front disc 2, which are functioning as guides, redirecting the axial air flow entering through the hole 21 in the front disc 2 to provide an induced radial flow when the fan 1 is operating. In FIG. 2b there is also shown how the front discs 2 is provided with a curved opening 22 in order to improve the aerodynamics of the fan 1 for redirecting the air flow entering through the hole 21.

Figure 2C:
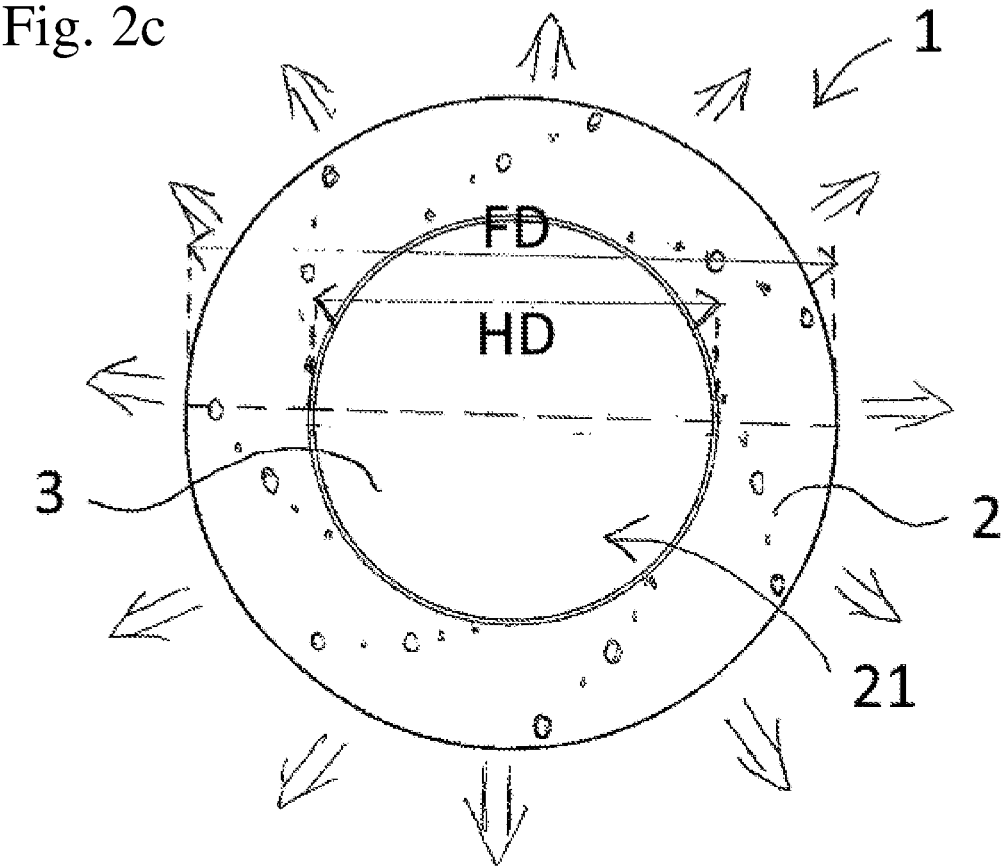

In FIG. 2c there is disclosed a top view of the fan 1 having an outer diameter FD of the back plate and 3 and front disc 2 and an inner diameter (HD) of the hole 21 in the front disc 2. As described above, air will enter through the hole 21 when the fan 1 is rotating and an air flow leaving the fan 1 will be directed in radial direction along the periphery of the fan 1 in all radial directions as indicated by the arrows.

Figure 2D:
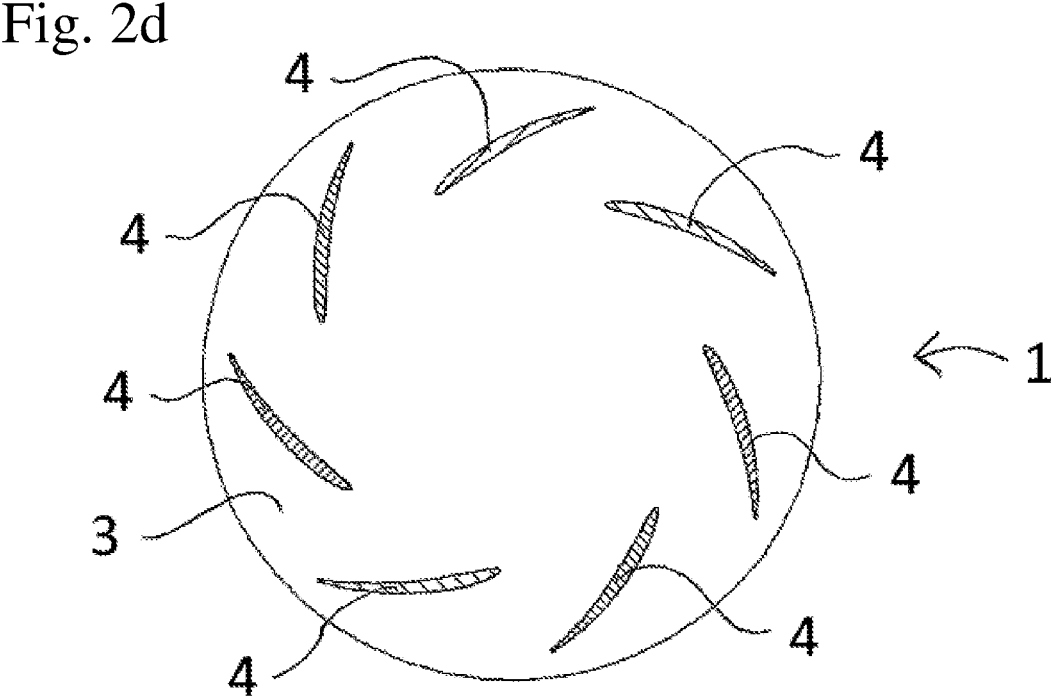

In FIG. 2d there is disclosed cross sectional view along the line A-A in FIG. 2b. As can be seen in FIG. 2d, the blades are not aligned along the length from their leading edge to their trailing edge in a radial direction but have an extension somewhat angled, about 60 degrees or more, relative an radial axis. The overall design of the fan 1, the shape of the blades and how the blades 4 are arranged in the fan 1 may differ from case to case and is dependent on the purpose of the fan 1 and the desired flow. In general, a blade 4 being more aligned with the radial direction will theoretically provide a higher flow but will suffer from aerodynamic drawbacks and a less stable flow with more wakes and turbulence produced. The blades 4 are preferably designed to have an aerofoil shape in order to reduce the build-up of turbulence along the fan blade 4.

In FIG. 2, the overall layout and design of a radial fan 1 is discussed. The present invention is in particular directed to assembling of a fan from a front disc 2, back plate 3 and fan blades 4 manufactured as separate units and how these parts are attached to each other.

Figure 3A:
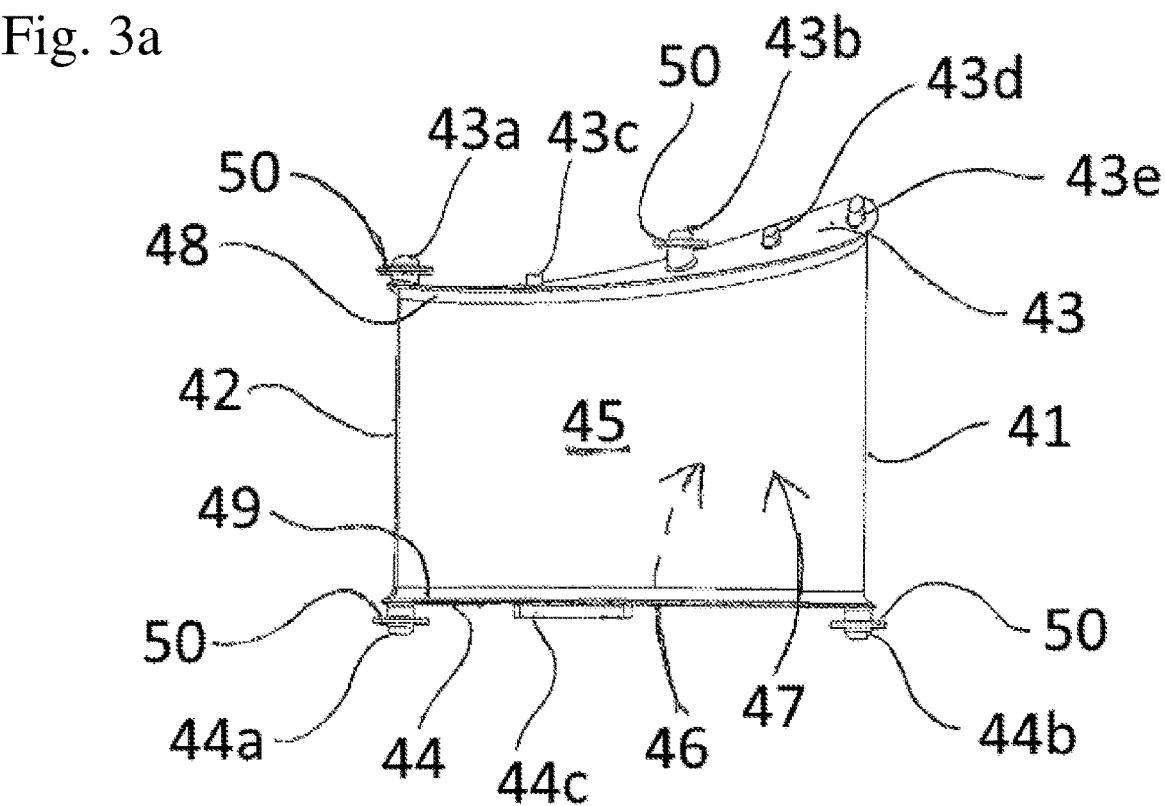
Figure 3B:
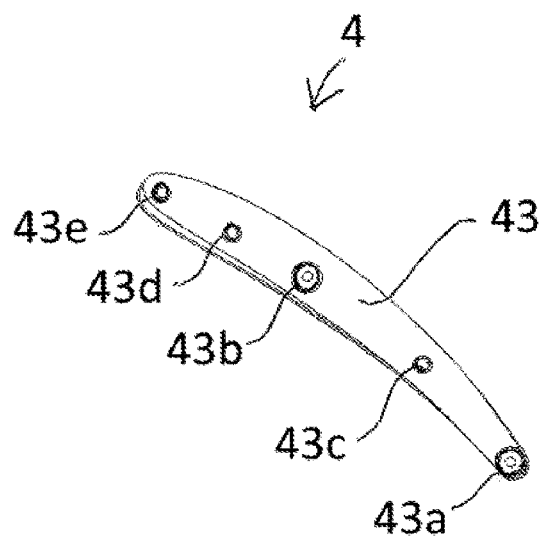
Figure 3C:
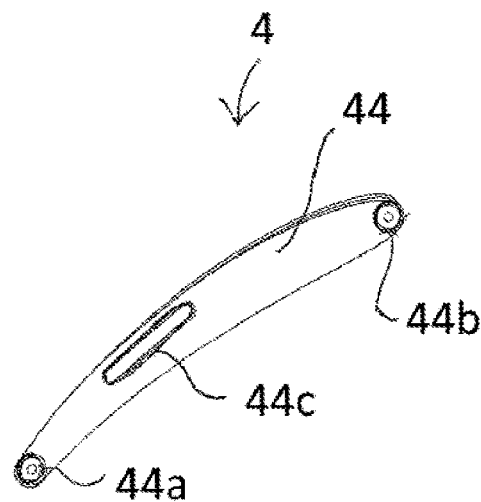

In FIG. 3 there is disclosed a fan blade 4 and FIG. 3a discloses a side view, FIG. 3b discloses a view as seen from above disclosing the upper edge 43 and FIG. 3c discloses a view as seen from below disclosing the lower edge 44.

In FIG. 3a there is disclosed a side view of the fan blade 4 showing a first side 46 of the fan blade body 45 which in this case is the high pressure side of the foil shaped blade 4. The second side 47 is located on the opposite side and thus works as the low pressure side. The fan blade 4 comprises a leading edge 41 which when mounted in the fan 1 is intended to face the flow induced by the fan 1 when rotating and located close to the inner circumference of the front disc 2 (see FIG. 2). The fan blade further comprises a trailing edge 42 at the opposite side of the leading edge 41 and being located close to the outer circumference of the front disc 2 when arranged in the fan. The leading edge 41 and trailing edge 42 stretches from the front disc 2 to the back plate 3 as can be seen in FIG. 2b. In FIG. 3a there is further disclosed the upper edge 43 facing towards and in contact with the front disc 2 when the fan 1 is assembled. The upper edge 43 includes a first interconnecting region 48 which comprises a curved portion in order to provide for a smooth interconnection between the surfaces of the fan blade sides 46, 47 and the surface of the front disc 2. The fan blade 4 further comprises a lower edge 44 facing towards and in contact with the back plate 3 when the fan 1 is assembled. The lower edge 44 includes a second interconnecting region 49 which is a widened portion in order to provide for a more stable attachment with the back plate 3 when the fan 1 is assembled. The second interconnecting region 49 may have a triangular cross sectional geometry.

The first interconnecting region 48, which interconnects the blade 4 with the front disc 2, is herein designed to improve the aerodynamic performance of the fan 1 and is smoothly curved or bent in order to reduce turbulence and formation of eddy currents. However, since the smoothly bent first interconnecting region 48 also is a widened portion of the fan blade 4 it will also contribute to a more stable attachment between the front disc 2 and the blade 4.

The second interconnecting region 49 which interconnects the lower edge 43 of the blade 4 with the back plate 3 is designed to have a widened portion mainly for the purpose of stabilizing the attachment of the blade 4 to the back plate 3. Hence, also the widening of the second interconnecting region 49 will serve to make the attachment more stable. Even though the fan blades are disclosed in the figures to comprise enlarged first and second interconnecting regions 48, 49, the blades may also be designed to have the same cross sectional area in the first and second interconnecting region 48, 49 as in the mid portion of the fan blade 4 and thus have essentially the same cross sectional area all the way from the lower edge 43 to the upper edge 44.

Figure 4:
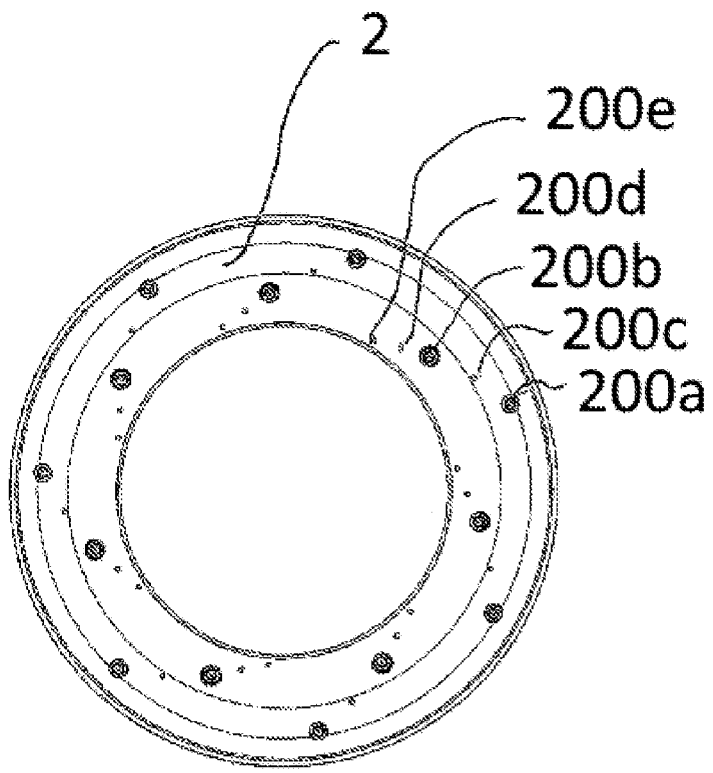
Figure 5:
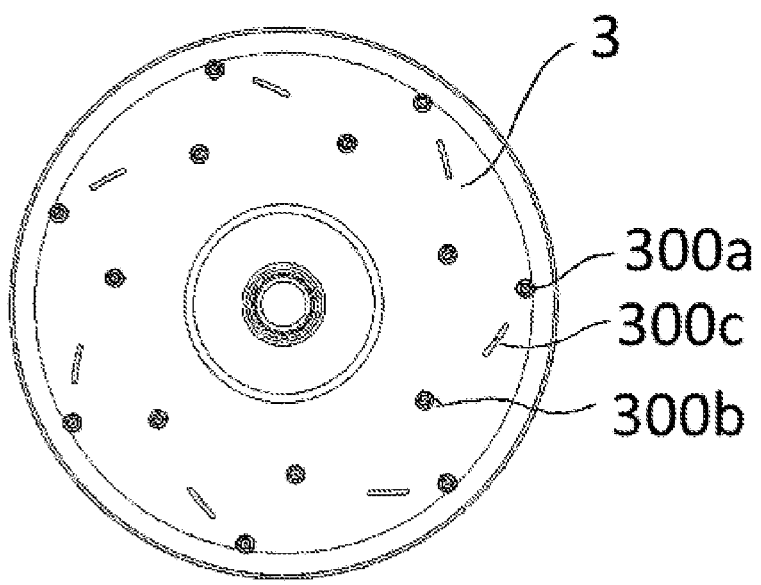

The fan blade 4 further comprises a multitude of upper attachment protrusions 43 *a-e* located on the upper edge 43. The upper edge 43 and the upper attachment protrusions 43 *a-e* are also shown in FIG. 3*b*. The upper attachment protrusions 43 *a-e* are designed to fit into corresponding front disc indentations 200 *a-e* in the front disc 2 (see FIG. 4). There are also a multitude of lower attachment protrusions 44 *a-c* located on the lower edge 44. The lower edge 44 and the lower attachment protrusions 44 *a-c* are also shown in FIG. 3*c*. The lower attachment protrusions 44 *a-c* are designed to fit into corresponding back plate indentations 300 *a-c* in the back plate (3) (see FIG. 5).

Figure 6:
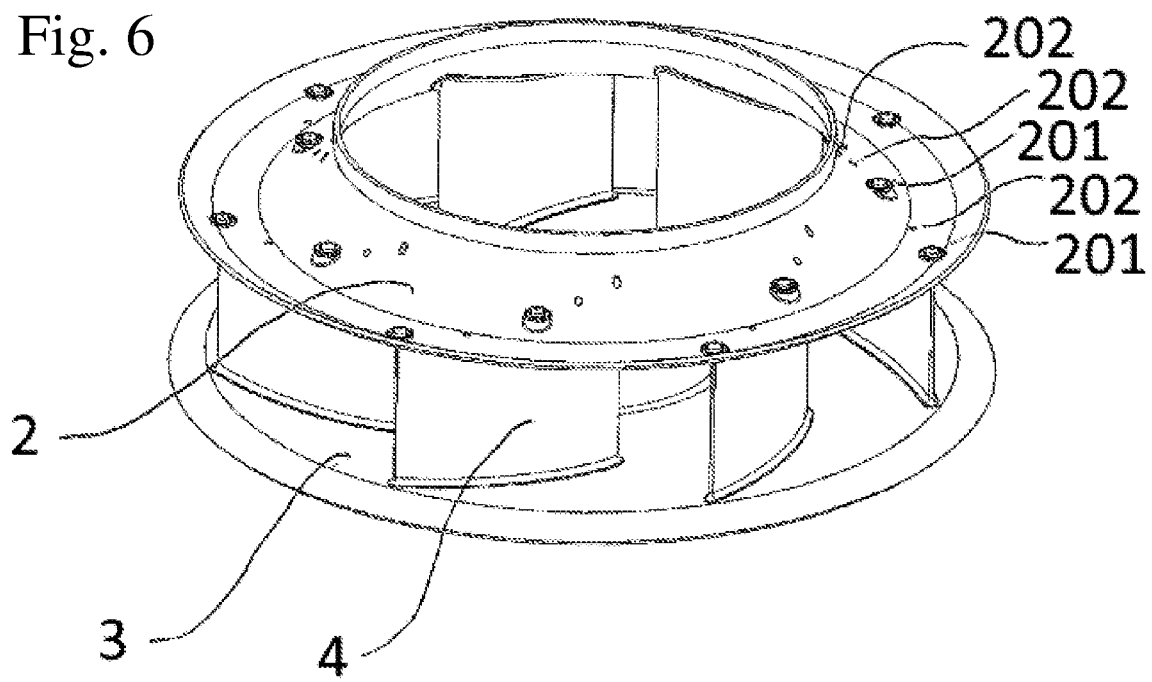

The upper attachment protrusions 43 *a-e* are designed to cooperate with the front disc indentations 200 *a-e* (see FIG. 4) to form front disc axial retainers 201 and radial retainers 202 (see FIG. 6). The lower attachment protrusions 44 *a-c* are designed to cooperate with the back plate indentations 300 *a-c* (see FIG. 4) to form back plate axial retainers 301 and radial retainers 302 (see FIG. 6). The upper attachment protrusions 43 *a-b* and lower attachment protrusions 44 *a-b* are designed to mainly counteract axial forces. These protrusions are designed to protrude through the corresponding front disc indentations 200 *a-b* and back plate indentations 300 *a-b*. In order to lock the arrangement, an axial locker 50 is attached onto the portion of the upper respectively lower attachment protrusions 43 *a-b*, 44 *a-b* protruding thorough the corresponding front disc indentations 200 *a-b* respectively back plate indentations 300 *a-b*. These arrangements will thus provide a retaining force between the front disc 2 and the back plate 3 so as to form axial front disc retainers 201 (see FIG. 6) and axial back plate retainers 301 (see FIG. 7). Other upper and lower attachment protrusions 43 *c-e*, 44*c* will cooperate with front disc indentations 200 *c-e* and back plate indentations 300 *c* in order to form radial front disc retainers 202 and radial back plate retainers 302 (see FIGS. 6 and 7).

Figure 8:
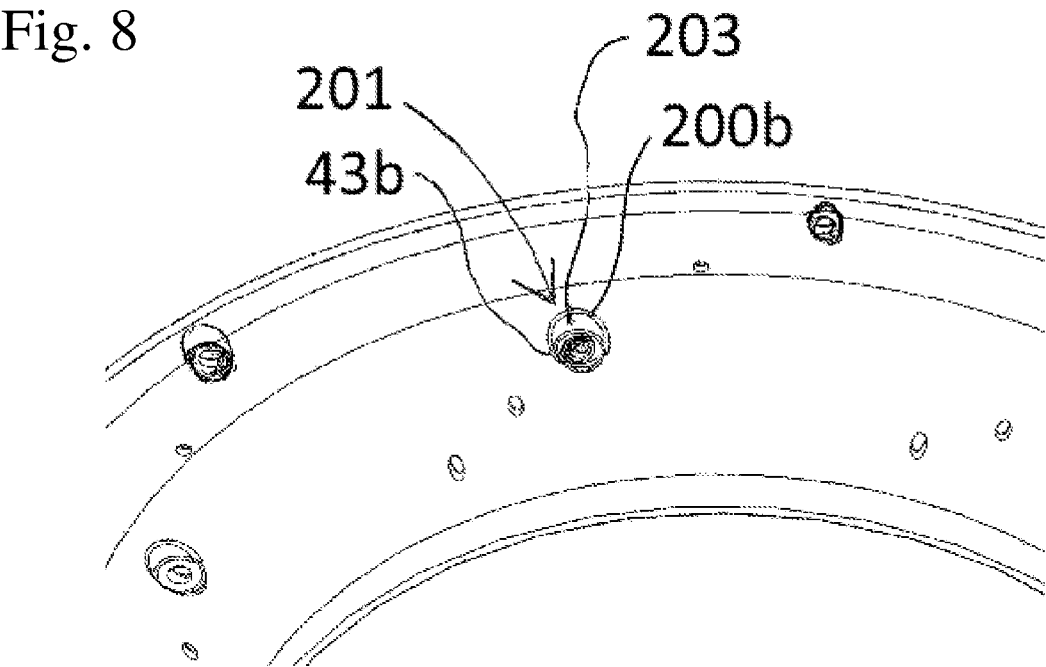
Figure 9:
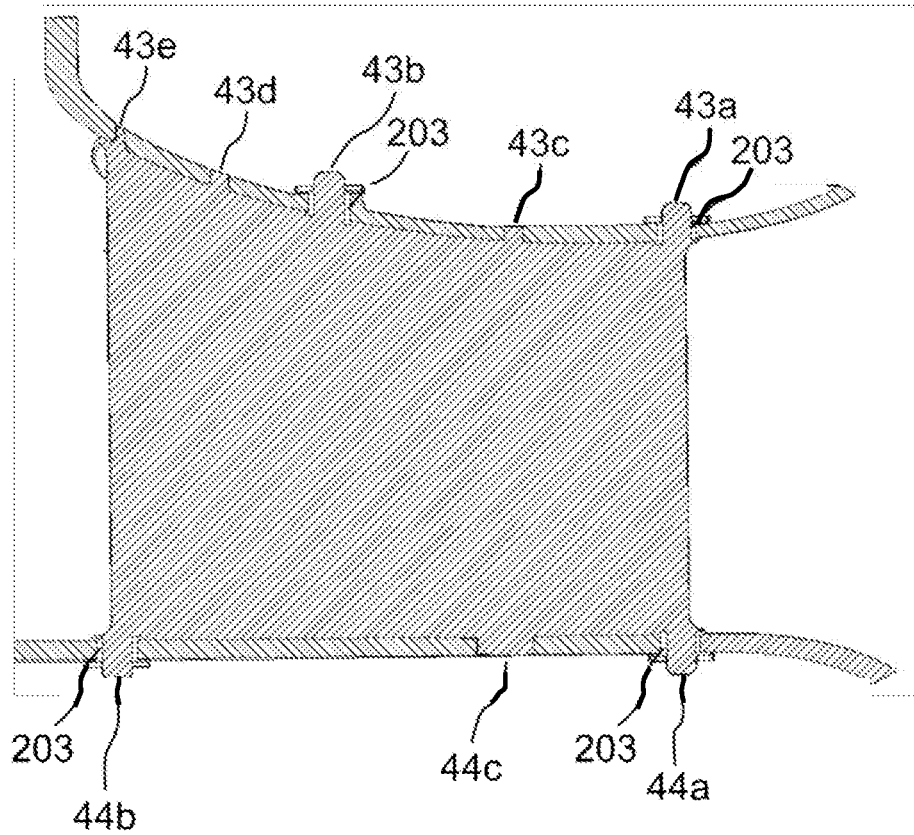

The axial retainers 201, 301 may be designed such that there is a gap 203 between the protrusions 43 *a-b*, 44 *a-b* and the corresponding indentations 200*a-b*, 300 *a-b*. In FIG. 8, this is exemplified by the front disc protrusions 43 *b* which are designed to fit into the corresponding indentation 200*b* such that there is a gap 203 formed between the wall of the indention 200*b* and the front disc protrusion 43 *b*. The gap 203 is also disclosed in FIG. 9 where there is a gap between the protrusions 43 *a-b*, 44 *a-b* forming axial retainers 201, 301 (se FIGS. 6 and 7) and their corresponding indentations. The other protrusions 43 *c-e*, 44*c* are designed to be in close contact with their corresponding protrusions so as to form radial retainers 202, 302 (see FIGS. 6 and 7).

Figure 10:
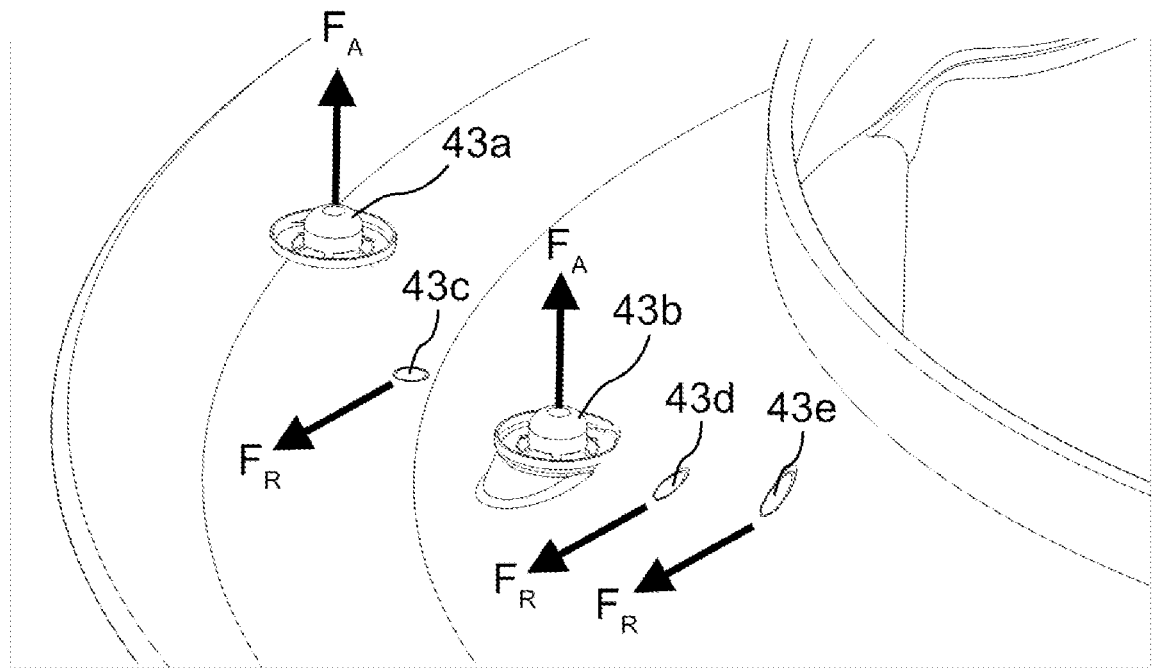

In FIG. 10 there is disclosed how the forces from different retainers are working mainly in different directions. Protrusions 43 *a-b* are protruding through the front disc 2 and locked in axial direction by the use of locker rings in order to mainly function as axial retainers 201 thus providing mainly an axial retaining force FA. The other protrusions 43 *c-e* are cooperating with their respective indentations in order to mainly provide a radial retaining force FR. These retainers need not be axially locked since they are not intended to provide a contracting force between the front disc 2 and backplate 3.

However, they may have some loose restraining arrangement working in the axial direction in order to prevent the retainers 43 *c-e* from being dislocated from their intended position and work properly for providing a radial retaining force FR. The specific design of the indentations and protrusions may vary in order to provide a retaining force in the radial direction FR or in the axial direction FA. As a general rule, the selection of direction in which a retainer is intended to work is dependent on how firmly and rigidly the retainer is designed to work in the direction. In the above examples, it has been disclosed that axial retainers are preferably designed by having protrusions which are loosely fit into their corresponding indentations leaving a gap between the protrusion and the indentation in at least an outwards radial direction while having an axial locking arrangement preventing the back plate and front disc from moving relative to each other in the axial direction. The radial retainer on the other hand is preferably designed such that the protrusion has a close fit with its indentation in the radial direction while the protrusion preferably is allowed to move in an axial direction relative to the indentation in order to reduce axial restraining forces. However, other means which allows movement in one direction but firmly restricts in another direction could be used, e.g. retainers comprising protrusions being designed to firmly withstand forces in one direction while being allowed to give in in other directions.

The fan disclosed in the figures only serves as an example of how to use the present invention. The fan could be modified to have different shapes of the fan blade, different shapes and number of retainers or using other means for locking the axial protrusions, e.g. welding or gluing. The fan could be made from a polymer by moulding. In particular, a polymer comprising a reinforcing substance is suitably used.

The invention claimed is:

1. An Air Handling Unit, AHU, having an extract air channel comprising:
   at least one extract air inlet for guiding extract air from a building to the outside through at least one extract air outlet and/or a supply air channel comprising at least one supply air inlet for guiding supply air from the outdoor into a building through at least one supply air outlet adapted to be connected to an air ventilation ducting system,
   said AHU further comprising at least one fan in order to induce a flow in the air ventilation ducting system when connected, said fan being assembled from a front disc, a back plate and a plurality of fan blades being manufactured as separate units, said front disc having a hole where through air enters and said fan blades being arranged to provide a radial flow in a radial direction of the fan or mixed flow from the fan, said fan blades having a leading edge arranged closer to the center axis of the fan than a trailing edge arranged further away from the center axis, said fan blades further having an upper edge comprising a multitude of upper attachment protrusions designed to fit into corresponding front disc indentations in the front disc and a lower edge comprising a multitude of lower attachment protrusions designed to fit into corresponding back plate indentations in the back plate, said fan blade further having a blade body with a first side and a second side, said fan blade comprising at least two upper attachment protrusions and at least two lower attachment protrusions designed to protrude through the corresponding front disc indentations and the corresponding back plate indentations respectively so as to form at least two front disc axial retainers and at least two back plate axial retainers, each of said two upper attachment protrusions and at least two lower attachment protrusions being provided with an axial locker on the distal end of the upper and lower attachment protrusions respectively protruding through the corresponding front disc indentations and back plate indentations respectively in order to provide a retaining force between the front disc and the back plate while at least one other upper attachment protrusion and one other lower attachment protrusion are designed to cooperate with front disc indentations and back plate indentations respectively so as to form at least one front disc radial retainer and at least one back plate radial retainer, wherein said at least two front disc axial retainers and said at least two back plate axial retainers provide retaining forces only in an axial direction retaining the back plate and the front disc at a constant distance from each other in the axial direction, and wherein said at least one front disc radial retainer and said at least one back plate radial retainer provide retaining forces only in the radial direction maintaining said fan blade at the same distance and position relative the center axis of the fan.

2. The Air Handling Unit, AHU according to claim 1, wherein said AHU being connected to an Electronic Control Unit, ECU, for control of the speed of the fan in dependence of one or several conditions sensed by at least one sensor, said ECU being programmed to allow the AHU to have a speed of the trailing edge of a fan blade to be at least 30 m/s.

3. A fan for an Air Handling Unit, AHU, said fan having a front disc, a back plate and a plurality of fan blades located between the front disc and the back plate, and said fan being assembled from the front disc, the back plate and the plurality of fan blades being manufactured as separate units, said front disc having a hole where through air enters and said fan blades being arranged to provide a radial flow in a radial direction of the fan or mixed flow from the fan, said fan blades having a leading edge arranged closer to the center axis of the fan than a trailing edge, said fan blades further having an upper edge comprising a multitude of upper attachment protrusions designed to fit into corresponding front disc indentations in the front disc and a lower edge comprising a multitude of lower attachment protrusions designed to fit into corresponding back plate indentations in the back plate, said fan blade having a blade body with a first side and a second side, wherein, at least one fan blade comprises at least two upper attachment protrusions and at least two lower attachment protrusions designed to protrude through the corresponding front disc indentations and the corresponding back plate indentations respectively so as to form at least two front disc axial retainers and at least two back plate axial retainers respectively, each of said two upper attachment protrusions and at least two lower attachment protrusions being provided with an axial locker on the distal end of the upper and lower attachment protrusions protruding through the front disc indentations and the corresponding back plate indentations respectively in order to provide a retaining force between the front disc and the back plate while at least one other upper attachment protrusion and one other lower attachment protrusion are designed to cooperate with a front disc indentation and back plate indentations respectively so as to form at least one front disc radial retainer and at least one back plate radial retainer functioning in order to provide retaining forces in the radial direction, said at least two front disc axial retainers and said at least two back plate axial retainers provide retaining forces only in an axial direction retaining the back plate and the front disc at a constant distance from each other in the axial direction, and said at least one front disc radial retainer and said at least one back plate radial retainer provide retaining forces only in the radial direction maintaining said fan blade at the same distance and position relative the center axis of the fan.

4. The fan according to claim 3, wherein at least one of said axial lockers is a locker ring fitted onto the distal end of the attachment protrusion to abut against the surface of the front disc or back plate surrounding the corresponding front disc indentations or back plate indentations.

5. The fan according to claim 4, wherein said locker ring is made of metal.

6. The fan according to claim 3, wherein said at least one upper attachment protrusion and/or at least one lower attachment protrusion designed to protrude through the corresponding front disc indentations and back plate indentations, respectively forming said axial retainers is designed such that the area of the indentation is larger than the cross sectional area of the portion of the corresponding attachment protrusion located in the indentation such that there is gap between the inner circumference of the indentation and the corresponding protrusion.

7. The fan according to claim 6, wherein said gap is extending all around the inner circumference of the indentation.

8. The fan according to claim 6, wherein said gap is extending along a portion of the inner circumference of the indentation being the subject of radial forces from the attachment protrusion when the fan wheel is rotating when the attachment protrusion is in contact with the inner circumference of the indentation while the attachment protrusion is allowed to be in contact with the inner circumference of the indentation along portions which are subjected to no or low forces from the attachment protrusion when the fan is rotating.

9. The fan according to claim 3, wherein the shape and size of said at least one other upper attachment protrusion and/or one other lower attachment protrusion designed to cooperate with a corresponding front disc indentation and back plate indentation respectively so as to form at least one radial retainer are designed such that the cross sectional area of the portion of the corresponding attachment protrusion located in the indentation makes a close fit all along the inner circumference of the corresponding front disc indentations and/or back plate indentation.

10. The fan according to claim 3, wherein the said at least one other upper attachment protrusion and/or one other lower attachment protrusion designed to cooperate with a corresponding front disc indentations and back plate indentation respectively so as to form at least one radial retainer are designed such that the portion of the corresponding attachment protrusion located in the indentation makes contact with the inner circumference of the corresponding front disc indentations and/or back plate indentation along a portion or portions of the inner circumference which is subjected to strong forces from the rotational movement of the fan from a protrusion in contact with said portion while there is a gap along other portion or portions of the inner circumference of the indentation being subjected to no or weak forces from the rotational movement of the fan by a protrusion in contact with the inner circumference of the indentation.

11. The fan according to claim 3, wherein said at least one front disc indentation or said back plate indentation forming part of one of the radial retainers comprises a recess or a groove having a bottom.

12. The fan according to claim 3, wherein there are at least two other upper attachment protrusions provided on the upper edge of the blade and/or two other lower attachment protrusions provided on the lower edge of the blade forming part of two front disc radial retainers or two back plate radial retainers, said at least two protrusions being spaced apart from each other along the longitudinal extension of the upper edge and/or the lower edge.

13. The fan according to claim 3, wherein the counterforce from the radial retainers in the plane perpendicular to the axial direction is at least 2 times higher than for the counterforce in the axial direction and/or the counterforce from the axial retainers counteracting a force separating the front disc and back plate in the axial direction is more than 2 times higher than the counterforce in the plane perpendicular to the axial direction when the fan wheel is operating in the fan wheel's normal mode of operation.

14. The fan according to claim 3, wherein there is at least one other upper attachment protrusion provided on the upper edge of the blade and/or at least one other lower attachment protrusion provided on the lower edge of the blade forming part of a front disc radial retainer or a back plate radial retainer, said at least one protrusion being elongated and having a length being at least two times longer than the at least one protrusion's width.

15. The fan according to claim 14 wherein the one or several elongated protrusions having their longitudinal extension or extensions in different directions relative the radial direction.

16. The fan according to claim 3, wherein the cross sectional area of the fan blade is enlarged at the fan blade's upper edge forming part of a first interconnecting region and/or at the fan blade's lower edge forming part of a second interconnecting region.

17. The fan according to claim 4, wherein said at least one upper attachment protrusion and/or at least one lower attachment protrusion designed to protrude through the corresponding front disc indentations and back plate indentations, respectively forming said axial retainers is designed such that the area of the indentation is larger than the cross sectional area of the portion of the corresponding attachment protrusion located in the indentation such that there is gap between the inner circumference of the indentation and the corresponding protrusion.

18. The fan according to claim 5, wherein said at least one upper attachment protrusion and/or at least one lower attachment protrusion designed to protrude through the corresponding front disc indentations and back plate indentations, respectively forming said axial retainers is designed such that the area of the indentation is larger than the cross sectional area of the portion of the corresponding attachment protrusion located in the indentation such that there is gap between the inner circumference of the indentation and the corresponding protrusion.

19. The fan according to claim 4, wherein the shape and size of said at least one other upper attachment protrusion and/or one other lower attachment protrusion designed to cooperate with a corresponding front disc indentation and back plate indentation respectively so as to form at least one radial retainer are designed such that the cross sectional area of the portion of the corresponding attachment protrusion located in the indentation makes a close fit all along the inner circumference of the corresponding front disc indentations and/or back plate indentation.

20. The fan according to claim 5, wherein the shape and size of said at least one other upper attachment protrusion and/or one other lower attachment protrusion designed to cooperate with a corresponding front disc indentation and back plate indentation respectively so as to form at least one radial retainer are designed such that the cross sectional area of the portion of the corresponding attachment protrusion located in the indentation makes a close fit all along the inner circumference of the corresponding front disc indentations and/or back plate indentation.

* * * * *